United States Patent
Benedikt et al.

(10) Patent No.: US 11,238,201 B2
(45) Date of Patent: Feb. 1, 2022

(54) PRE-STEP CO-SIMULATION METHOD AND DEVICE

(71) Applicant: Virtual Vehicle Research GmbH, Graz (AT)

(72) Inventors: Martin Benedikt, Frohnleiten (AT); Simon Genser, Kapfenberg (AT); Jost Bernasch, Graz-Kroisbach (AT)

(73) Assignee: Virtual Vehicle Research GmbH, Graz (AT)

( * ) Notice: Subject to any disclaimer, the term of this patent is extended or adjusted under 35 U.S.C. 154(b) by 243 days.

(21) Appl. No.: 16/433,946

(22) Filed: Jun. 6, 2019

(65) Prior Publication Data

US 2019/0377844 A1 Dec. 12, 2019

(30) Foreign Application Priority Data

Jun. 7, 2018 (EP) .................................... 18176520

(51) Int. Cl.
*G06F 30/33* (2020.01)
*G06F 111/04* (2020.01)
(Continued)

(52) U.S. Cl.
CPC .............. *G06F 30/33* (2020.01); *G06F 17/11* (2013.01); *G06F 17/13* (2013.01); *G06F 30/20* (2020.01);
(Continued)

(58) Field of Classification Search
CPC ...... G06F 2111/10; G06F 30/20; G06F 17/13; G06F 17/11
See application file for complete search history.

(56) References Cited

U.S. PATENT DOCUMENTS 6,110,215 A * 8/2000 Stone ...................... G06F 30/20 703/6
9,223,754 B2 * 12/2015 Belsky .................... G06F 30/20
(Continued)

FOREIGN PATENT DOCUMENTS

| EP | 2 680 157 A1 | 1/2014 |
| EP | 2 442 248 B1 | 12/2016 |
| EP | 3 136 267 A1 | 3/2017 |

OTHER PUBLICATIONS

S. Sadjina, L. T. Kyllingstad, S. Skjong, E. Pedersen, "Energy conservation and power bonds in co-simulation: non-iterative adapative step size control and error estimation" pp. 607-620 (Year: 2016).*

(Continued)

*Primary Examiner* — Kibrom K Gebresilassie
(74) *Attorney, Agent, or Firm* — Robert A. Blaha; Smith Tempel Blaha LLC (57) ABSTRACT

A pre-step co-simulation method and device for co-simulation of several subsystems is disclosed, utilizing partial derivatives of replacement subsystems. On this basis, the exact solutions of output variables of the individual subsystems are approximated by evaluation of an Error Differential Equation in order to estimate the future progress of the approximated exact output variables; corresponding input variables are determined by optimization prior to the current co-simulation time increment. The pre-step co-simulation method is realized within a computer-executable program and implemented in a network of computing nodes.

13 Claims, 4 Drawing Sheets

(51) Int. Cl.
G06F 17/13 (2006.01)
G06F 30/20 (2020.01)
G06F 111/10 (2020.01)
G06F 17/11 (2006.01)

(52) U.S. Cl.
CPC ....... *G06F 2111/04* (2020.01); *G06F 2111/10* (2020.01)

(56) References Cited

U.S. PATENT DOCUMENTS

| | | | | |
|---|---|---|---|---|
| 10,755,003 | B2* | 8/2020 | Maturana | G05B 17/02 |
| 2001/0038334 | A1* | 11/2001 | Magerle | G08B 17/00 |
| | | | | 340/584 |
| 2012/0197617 | A1* | 8/2012 | Mujagic | G06F 30/331 |
| | | | | 703/7 |
| 2014/0005989 | A1* | 1/2014 | Belsky | G06F 17/13 |
| | | | | 703/2 |

OTHER PUBLICATIONS

S. Sadjina, L. T. Kyllingstad, S. Skjong, E. Pedersen, "Energy conversation and power bonds in co-simulation: non-iterative adaptive step size control and error estimation" 2016, pp. 607-620 (Year: 2016).*

Sadjina, S. et al., Energy Conservation and Power Bonds in Co-Simulations Non-iterative Adaptive Step Size Control and Error Estimation, Engineering with Computers (2017) 33, pp. 607-620.

Viel, A.: "Implementing stabilized co-simulation of strongly coupled systems using the Functional Mockup Interface 2.0"; 10th International Modelica Conference, 2014.

Blochwitz, T. et al.: "Functional Mockup Interface 2.0: The Standard for Tool independent Exchange of Simulation Models"; 9th International Modelica Conference, 2012.

Genser, S. and Benedikt, M.: "Derivation of a New Method for Derivative Estimation by Linear Combinations"; The 9th International Conference on Advances in System Simulation, 2017.

Hairer, E. and Wanner, G.: "Solving Ordinary Differential Equations Stiff and Differential-Algebraic Problems" Springer Series in Computational Mathematics, 2nd Edition, 2010.

Van Overschee, P. and De Moor, B. L.: "Subspace identification for linear systems: Theory—Implementation—Applications"; Springer Science & Business Media, 2012.

Sicklinger, S. et al., Interface Jacobian-based Co-Simulation, International Journal for Numerical Methods in Engineering, 2014: 98, pp. 418-444.

* cited by examiner

PRE-STEP CO-SIMULATION METHOD AND DEVICE

CROSS-REFERENCE TO RELATED APPLICATIONS

This application claims the benefit of the filing date of the European Patent Application No. 18 176 520.7 filed 7 Jun. 2018, the disclosure of which is hereby incorporated herein by reference.

TECHNICAL FIELD

The present invention relates to a method for simulating a real physical model on the basis of a pre-step co-simulation system and a simulating device for simulating a real physical model on the basis of a pre-step co-simulation system.

TECHNOLOGICAL BACKGROUND

Nowadays, usage of numerical simulation for design, analysis and engineering of technical systems is common practice in industry and a lot of different modelling approaches and tailored numerical solvers are available. The behavior of physical systems is typically described by ordinary differential equations (ODEs) or differential algebraic equations (DAEs). Numerical solvers are used to approximate the analytical solutions thereof at dedicated points in time, whereas a discretization error is introduced. Different approaches exist for correction and most often iterative (implicit) solvers are applied. In case of real-time simulation, i.e. time concurrent simulation, iterations lead to an undefined runtime behavior and thus, correction measures are applied after the explicit simulation time increment. However, a similar situation occurs in co-simulation.

Co-Simulation represents a special simulation discipline, where several subsystems are simulated independently over co-simulation time increments and data is exchanged for synchronization purposes at dedicated points in time. This approach is typically used for holistic system simulation, in cases where modeling or simulation of the overall system within a single simulation tool is impossible.

In contrast to the classical numerical simulation approach mentioned above, in case of co-simulation, additional master algorithms, i.e. higher-level numerical solvers, are necessary to solve the overall system simulation. Due to limited or restricted interfacing and co-simulation capabilities of the involved simulation tools iterative (implicit) co-simulation approaches are not applicable in general; those are only used for dedicated integration of a few (typically two or three) subsystem simulations. On the other hand, non-iterative co-simulation is common practice with its drawback of introducing a significant coupling error, i.e. co-simulation discretization error, on higher master algorithm level. In contrast to the classical numerical simulation approach, mitigation of this co-simulation discretization error is restricted due to limited interfacing and co-simulation capabilities of the involved simulation tools, e.g. no access to subsystem-internal system states or resetting of subsystem simulation increments. As co-simulation becomes more and more relevant in different industries recently several approaches were developed in order to cope with this specific problem.

EP 2 442 248 B1 describes an approach where modifications are applied to the subsystem inputs for compensation of the co-simulation discretization error over subsequent co-simulation time increments. Recently, Sadjina-2016 proposed an extension to this approach where additional model information, i.e. output and input partial derivatives referred to as Interface-Jacobians, is utilized for modification of the relevant subsystem inputs, especially for handling algebraic loops. The exchange and utilization of Interface-Jacobian matrices are exemplarily used by EP 2 680 157 A1. This additional subsystem information enables master algorithms to cope with stability issues related to system simulation critical properties like stiffness or algebraic loops.

However, currently existing approaches for mitigating the co-simulation discretization error in non-iterative co-simulation are applied exclusively after the current co-simulation time increment at the coupling time instant, i.e. post-step, and impact the overall system simulation in a delayed manner. This may lead to stability issues or to a decreased accuracy of the overall co-simulation. Furthermore, current approaches are based on centralized schemes which may limit co-simulation performance.

SUMMARY

There may be a need to provide a method and a device, wherein a real physical model can be simulated more precisely and in a more efficient way.

The object may be solved by a method and a simulation device for simulating a real physical model according to the subject matter of the independent claims.

According to an embodiment of the present invention, a method for simulating a real physical model on the basis of a pre-step co-simulation system is presented. According to the method, a first subsystem is provided simulating at least one first parameter (e.g. the speed v of a vehicle) of the real physical model on the basis of a first equation system (e.g. behavioral model) (local), wherein the first equation system is configured for determining the first parameter (v) on a basis of at least one second parameter (e.g. the propulsion force of the vehicle F).

Furthermore, a second subsystem is presented simulating the at least one second parameter (F) of the real physical model on the basis of a second equation system (local), wherein the second equation system is configured for determining the second parameter (F) on a basis of the at least one first parameter (v). The first input value (v_in) of the first parameter (v) in the second subsystem and the second input value (F_in) of the second parameter (F) in the first subsystem are estimated by extrapolation at a first coupling time point. The method further comprises determining a first output value (v_out) of the first parameter (v) by the first subsystem and a second output value (F_out) of the second parameter (F) by the second subsystem.

The method further comprises determining a first error between the estimated first input parameter (v_in) and the determined first output parameter (v_out) and a second error between the estimated second input parameter (F_in) and the determined second output parameter (F_out) at a subsequent second coupling time point.

Furthermore, according to the method, the first local replacement model of the real physical model which is based on partial derivatives of the first subsystem is defined and a second local replacement model of the real physical model which is based on partial derivatives of the second subsystem is defined.

Thereby the local replacement models represent abstract and simplified models and mimic the behavior of the corresponding simulated real physical subsystems (cf. Eq. 10-11), where simulating the first local replacement model and the corresponding first subsystem leads to almost similar first output variables based on equal second input variables, and where simulating the second local replacement model and the corresponding second subsystem leads to almost similar second output variables based on equal first input variables. The local replacement models are based on partial derivatives which essentially described the sensitivity of subsystem output parameters changes with respect to corresponding input and output parameters.

On the basis of the first local replacement model and the second local replacement model an Error Differential Equation is defined, wherein the Error Differential Equation is configured for receiving the first error and the second error for determining a first characteristic of the first parameter over time and/or second characteristic of the second parameter over time between the first coupling time point and a subsequent second coupling time point. On the basis of the first characteristic of the first parameter and/or the second characteristic of the second parameter the first input value (v_in) of the first parameter (v) and/or the second input value (F_in) of the second parameter (F) at the subsequent coupling time point is optimized at the second coupling point for simulating the first parameter (v) in the first subsystem and/or the second parameter (F) in the second subsystem.

Thereby, the Error Differential Equation describes the deviation of the first characteristic of the first parameter and/or the second characteristic of the second parameter to the corresponding first and/or second output values, respectively, based on the first error and the second error.

According to a further embodiment, a simulating device for simulating a real physical model on the basis of a pre-step co-simulation system is presented. The simulating device comprises units for processing the above described method. Accordingly, the simulating device comprises a first subsystem unit having a first subsystem simulating at least one first parameter of the real physical model on the basis of a first equation system, wherein the first equation system is configured for determining the first parameter on a basis of at least one second parameter. The device further comprises a second subsystem unit having a second subsystem simulating the at least one second parameter of the real physical model on the basis of a second equation system, wherein the second equation system is configured for determining the second parameter on a basis of the at least one first parameter.

Furthermore, the device comprises an estimating unit configured for estimating the first input value of the first parameter in the second subsystem and the second input value of the second parameter in the first subsystem by extrapolation at a first coupling time point (T k−1), wherein a first output value of the first parameter is determinable by the first subsystem and a second output value of the second parameter is determinable by the second subsystem.

Furthermore, the device comprises determining a first error between the estimated first input value of the first parameter and the determined first output value of the first parameter and a second error between the estimated second input value of the second parameter and the determined second output value of the second parameter at a subsequent second coupling time point.

The device further comprises an Error Differential Equation unit for defining a first local replacement model of the real physical model which is based on partial derivatives of the first subsystem and for defining a second local replacement model of the real physical model which is based on partial derivatives of the second subsystem, wherein on the basis of the first local replacement model and the second local replacement model an Error Differential Equation is definable by the Error Differential Equation unit.

The Error Differential Equation is configured for receiving the first error and the second error for determining a first characteristic of the first parameter over time and/or a second characteristic of the second parameter over time between the first coupling time point and a subsequent second coupling time point.

The device further comprises an optimization unit configured for optimizing the first input value of the first parameter and/or the second input value of the second parameter at the subsequent coupling time point on the basis of the first characteristic of the first parameter and/or the second characteristic of the second parameter for simulating the first parameter in the first subsystem and/or the second parameter in the second subsystem.

OVERVIEW OF EMBODIMENTS

By the present invention, a pre-step co-simulation method and device for co-simulation of several subsystems is described, utilizing partial derivatives for establishing replacement models for the subsystems. On this basis, the exact solutions, i.e. the characteristics, of output variables of the individual subsystems are approximated by evaluation of an Error Differential Equation in order to estimate the future progress of the approximated exact output variables; corresponding input variables are determined by optimization prior to the current co-simulation time increment. The pre-step co-simulation method is realized within a computer-executable program and implemented in a network of computing nodes.

Furthermore, in prior art course in relation methods, the simulation result becomes more exact if more hardware resources, such as faster processors and larger storages, are provided. By the present invention, more exact simulation results are achieved without the need of more hardware resources. Furthermore, the invention allows for larger coupling step-sizes and thus leads to a decreased amount of data exchanges—the exchange of first and second parameters—at coupling time points, which renders the overall pre-step co-simulation method to be more efficient.

The real physical model may be for example a vehicle, such as a car, which have to be simulated under real conditions and real parameters. The real physical model is very complex to simulate. Hence, co-simulation technique is used, wherein the complex real physical model is separated in the respective subsystems. Each respective subsystem calculates a desired parameter. However, sometimes subsystem needs as an input parameter the calculated output value of the parameter of a further subsystem which did not calculate the value of the respective input parameter at the coupling time point, where the subsystem needs the respective input value of the parameter.

Hence, especially if the first subsystem and the second subsystem are dependent on each other by their respective parameters, input values of the parameter of a respective subsystem have to be approximated or computed. It is an aim to provide a very exact approximation of the respective input values of the parameters.

The respective subsystems simulate a desired parameter. Hence, after simulating a parameter by the respective first system, an output value of the respective parameter is determined. The parameter may be for example speed, braking force, drag, torque of vehicle axis, impact forces, fuel consumption of the vehicle etc.

Each subsystem comprises a respective equation system which describes the subsystem behavior which may consist of a plurality of equations. However, because in practice not all necessary input values for parameters are given, the equation system cannot be solved properly.

Hence, according to the present invention, the first input value of a first parameter in the second subsystem and the second input value of the second parameter in the first subsystem are estimated by extrapolation at a first coupling time point. Hence, by extrapolation, basic first and second input values of the respective parameters are given in order to provide a first simulation step by the first and second subsystems. Accordingly, the first output value of the first parameter by the first subsystem and the second output value of the second parameter by the second subsystem can be determined.

Subsequently, a first error between the estimated first input value of the first parameter in the second subsystem and a simulated first output value of the first parameter from the first subsystem is determined. Accordingly, a second error between the estimated second input value of the second parameter in the first subsystem and the simulated second output value of the second parameter from the second subsystem is determined.

Furthermore, respective local replacement models based on partial derivatives of the first subsystem and the second subsystem can be determined. The partial derivatives of the local replacement models are computed based on the original subsystem matrices. On the basis of the first and second replacement models an Error Differential Equation is defined. The first error and the second error are input in the Error Differential Equation for determining a first characteristic of the first parameter over time and/or the second characteristic of the second parameter over time between a first coupling time point and the subsequent second coupling time point is possible. The characteristic of the first parameter and the second parameter define the exact solution and behavior of the respective parameters between two coupling time points, namely the first coupling time point, where the first simulation of the subsystems was initiated, and a subsequent second coupling time point.

The coupling time points define points in time, where respective values of the respective parameters are exchanged between the subsystems. The second coupling time point follows temporally the first coupling time point. The first coupling time point may be an initial coupling time point at the beginning of the simulation or a specific coupling time point during the simulation.

On the basis of the first and second characteristics of the respective parameters, the first input value of the first parameter and the second input value of the second parameter at the subsequent second coupling time point are optimized. Thereby, the simulation of the first parameter from the first subsystem and the second parameter from the second subsystem are optimized as well.

Hence, by the present invention, local replacement models are defined by partial derivatives so that a characteristic of the respective parameters between two coupling time points can be determined. This leads to a more exact estimation of input values of parameters in the respective subsystems so that a more precise simulation of a real physical model is possible. Furthermore, due to the increased accuracy enlarged coupling step-sizes (e.g. time increments between coupling time points) are possible leading to a decreased amount of data exchange so that the overall co-simulation becomes more efficient. Hence, more complex real physical models may be simulated and hence more complex real physical models can be engineered in reality. Due to the increasing system complexity of real physical models (such as cars or airplanes) the hardware resources are not able to simulate the real physical models. Hence, by the present invention, existing hardware resources (such as presently existing processors (CPUs)) can realize the simulation and hence the development of more and more complex real physical models.

According to a further exemplary embodiment, a global replacement model of the real physical model is defined which is based on partial derivatives of the first subsystem and on partial derivatives of the second subsystem, wherein the global replacement model is configured for estimating a future characteristic of the first parameter and/or the second parameter between the second coupling time point and a subsequent third coupling time point such that a next first input parameter of the first parameter and a next second input parameter of the second parameter at the second coupling time point can be determined. The third coupling time point follows temporally the first and second coupling time point.

According to a further exemplary embodiment, the global replacement model is based on a transformation of the first subsystem and the second subsystem by time derivation of the first output value of the first parameter (v out) and the second output value of the second parameter (F out).

According to a further exemplary embodiment, the solution of the Error Differential Equation is approximated by an explicit or implicit numerical solver (see e.g. Eq. 21).

According to a further exemplary embodiment, the estimation by extrapolation is a model-based extrapolation for prediction of the approximated exact output variables/values of the respective parameters is utilized.

In this context model-based extrapolation is referred to an approach where the partial derivatives of the corresponding local replacement models are utilized to construct a global replacement model and this global replacement model is simulated into the future based on the first and second input parameters. The resulting first and second output parameters then represent model-based extrapolated parameters, respectively.

According to a further exemplary embodiment, the estimation by extrapolation is a signal-based extrapolation for prediction of the approximated exact output variables is utilized.

According to a further exemplary embodiment, the optimization of the input variables is based on a variational approach.

For example, for optimization of the input variables transition matrices (Eq. 29) are computed based on replacement system matrices (Eq. 10-11). The optimization of the input variables may be based on energy-preservation aspects.

According to a further exemplary embodiment, the partial derivatives of the first subsystem and the partial derivatives of the second subsystem are calculated instantaneously, in particular by using a subspace system identification algorithm. The partial derivatives of the subsystems/models (see for example Eq. 10-11) are identified instantaneously (i.e. online).

Thereby, subspace system identification algorithms represent an approach for determining linear replacement models from a time series of input and output values of the real physical subsystems, where the most significant dynamics of the corresponding real physical subsystems are identified automatically by the algorithm and the matrices of the underlying linear replacement models represent the partial derivatives of the original subsystems.

According to a further exemplary embodiment, the time increment between the first coupling time point and the second coupling time point is adapted on the basis of the first error and the second error. Hence, if the first error and the second error between the estimated input values and the respectively determined output values of the respective first or second parameters is small, the time increment between two coupling time points can be increased for a subsequent simulation, i.e. a subsequent coupling. Accordingly, if the first error and the second error between the estimated input values and the respectively determined output values of the respective first or second parameters is large, the time increment between two coupling time points can be reduced for a subsequent simulation, i.e. a subsequent coupling. Hence, a current co-simulation time increment can be adapted determined based on the error indicator (Eq. 22-24) utilizing the deviation (Eq. 19) of the output variables from the approximated exact output variables.

According to a further exemplary embodiment the simulating device comprises a single or multiple computing nodes connected via a communication network to a network of computing nodes, a memory area to store the input values of the first and second parameter, the partial derivatives, output values of the first and second parameter and in particular output derivative variables, the computed partial derivatives of the subsystems and the first and second equations and at least one processor having access to the memories of the computing nodes and configured to execute the above described method.

According to a further exemplary embodiment of the simulating device the computing nodes represent real-time systems and the communication of data is preformed asynchronous.

According to a further exemplary embodiment, a computer-readable medium is presented on which there is stored a computer program for simulating a real physical model, the computer program, when being executed by a data processor, is adapted for performing and/or controlling the above described method.

According to a further exemplary embodiment, a program element for simulating a real physical model is presented. The program element, when being executed by a data processor, is adapted for controlling the above described method.

Summarizing by the present invention a pre-step co-simulation method is defined comprising, computing partial derivatives of the individual replacement subsystems (see e.g. Eq. 10-11) and assembling the derived matrices (see e.g. Eq. 15-16). The method further comprises approximating exact output variables by evaluation of an Error Differential Equation and estimating the future progress of the approximated exact output variables for each of the individual subsystems based on replacement system dynamic and system input matrices. Finally, input variables are optimized prior to the co-simulation time increment.

A pre-step co-simulation method and device for co-simulation of several subsystems is disclosed, utilizing partial derivatives of replacement subsystems. On this basis, the exact solutions of output variables of the individual subsystems are approximated by evaluation of an Error Differential Equation in order to estimate the future progress of the approximated exact output variables; corresponding input variables are determined by optimization prior to the current co-simulation time increment. The pre-step co-simulation method is realized within a computer-executable program and implemented in a network of computing nodes.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

DETAILED DESCRIPTION OF ILLUSTRATED EMBODIMENTS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

The illustrations in the drawings are schematically presented. It is noted that in different figures similar or identical elements are provided with the same reference signs.

A pre-step co-simulation method of 100, 200 (see FIG. 1 and FIG. 2) and device 300 (see FIG. 3) is shown, that can be used for simulating a complex physical system and real physical models, which comprises an arbitrary number of subsystems 308. The subsystems 308 can represent models of real objects simulated in dedicated simulation tools or even real hardware components mounted on tailored test-beds in case of real-time applications. Due to the modular character of the co-simulation for synchronization purposes data is communicated via a network 302 (see FIG. 3) and is exclusively exchanged between subsystems at dedicated communication points in time (coupling time points). Subsystems 308 are executed independently between these communication point instances.

Figure 1:
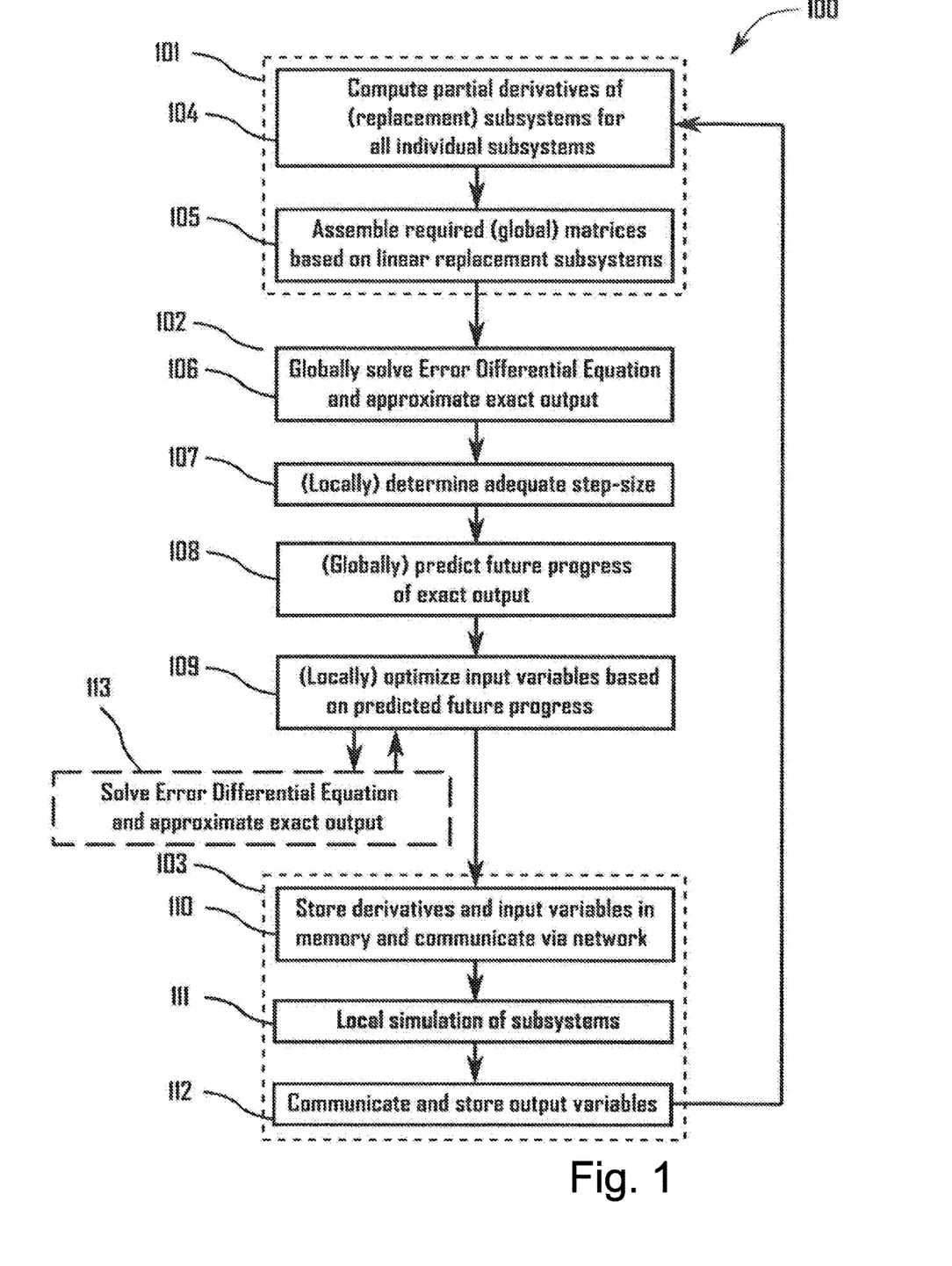
FIG. 1 shows a flowchart illustrating a complete cycle for co-simulation with respect to the herein described computer-implemented pre-step co-simulation method.

FIG. 1 shows a flowchart illustrating a complete cycle for co-simulation with respect to the herein described computer-implemented pre-step co-simulation method. The pre-step co-simulation method further comprises the computation in step 104 (compute partial derivatives of (replacement) subsystems for all individual subsystems) of replacement system (Eq. 10-11) matrices and the assembly in step 105 (assemble required (global) matrices based on linear replacement subsystems) of derived matrices (Eq. 15-16) in step 101 (Compute partial derivatives of (replacement) subsystems for all individual subsystems), approximating the exact output variables/values of the respective parameters of the individual subsystems by evaluation of an Error Differential Equation in 106 (globally valve Error Differential Equation and approximate exact output), optionally adapting the (local) co-simulation time increment in step 107 (locally determined adequate step size), predicting the future progress of the exact output variables in step 108 ((globally) predict future progress of exact output) and optimizing corresponding input values of the first and second parameters in step 109 ((locally) optimise input variables based on predicted future progress) prior to the current co-simulation time increment in step 111 (local simulation of subsystems).

Figure 2:
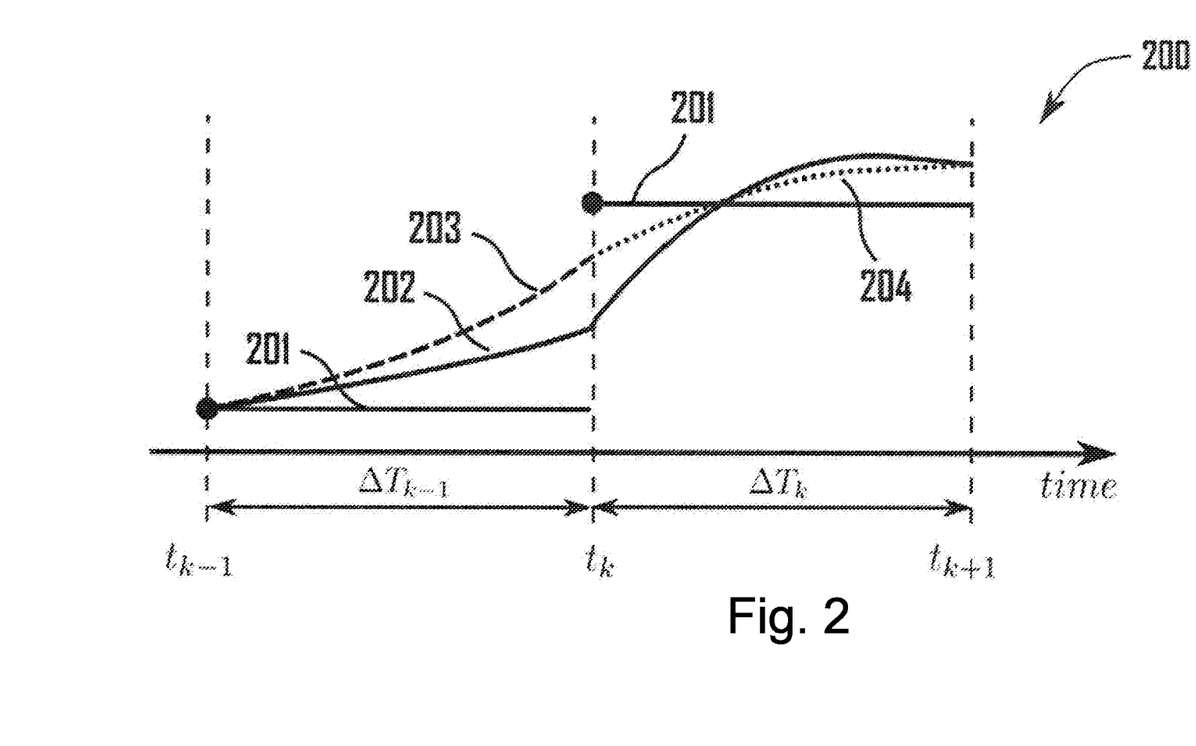
FIG. 2 shows a diagram indicating the different steps to be performed for realizing the pre-step co-simulation method.

FIG. 2 shows a diagram indicating the different steps to be performed for realizing the pre-step co-simulation method for simulating a real physical model according to the present invention. FIG. 2 shows graphs of simulations at certain coupling time points Tk of one subsystem 308. A respective first subsystem 308 is provided simulating at least one first parameter (e.g. the speed v of a vehicle) of the real physical model on the basis of a first equation system (e.g. a behavioral model) (local), wherein the first equation system is configured for determining the first parameter (v) on a basis of at least one second parameter (e.g. the torque of a shaft of the vehicle F).

Furthermore, a second subsystem 308 simulates the at least one second parameter (F) of the real physical model on the basis of a second equation system (local), wherein the second equation system is configured for determining the second parameter (F) on a basis of the at least one first parameter (v). The first input value (v_in) of the first parameter (v) in the second subsystem and the second input value (F_in) of the second parameter (F) in the first subsystem are estimated by extrapolation (curve 201) at a first (e.g. an initial) coupling time point (T, k−1). The method further comprises determining a first output value (v_out) of the first parameter (v) by the first subsystem and a second output value (F_out) of the second parameter (F) by the second subsystem (curve 202).

The method further comprises determining a first error between the estimated first input parameter (v_in) (curve 201) and the determined first output parameter (v_out) (curve 202) and a second error between the estimated second input parameter (F_in) (curve 201) and the determined second output parameter (F out) (curve 202) at a subsequent coupling time point (e.g. the Errors at T,k).

A first local replacement model of the real physical model which is based on partial derivatives of the first subsystem is defined and a second local replacement model of the real physical model which is based on partial derivatives of the second subsystem is defined.

On the basis of the first local replacement model and the second local replacement model an Error Differential Equation is defined, wherein the Error Differential Equation is configured for receiving the first error and the second error for determining a first characteristic of the first parameter over time and/or second characteristic of the second parameter over time between the first coupling time point and a subsequent second coupling time point (at coupling time point Tk, i.e. the curve 203 between Tk−1 and Tk). On the basis of the first characteristic of the first parameter and/or the second characteristic of the second parameter the first input value (v_in) of the first parameter (v) and/or the second input value (F_in) of the second parameter (F) at the subsequent coupling time point is optimized (at Tk) for simulating the first parameter (v) in the first subsystem and/or the second parameter (F) in the second subsystem.

Thereby, optimization is based on the extrapolation of the first and second characteristic 204 at the second coupling time point till the third coupling time point by utilizing the global replacement model.

Figure 3:
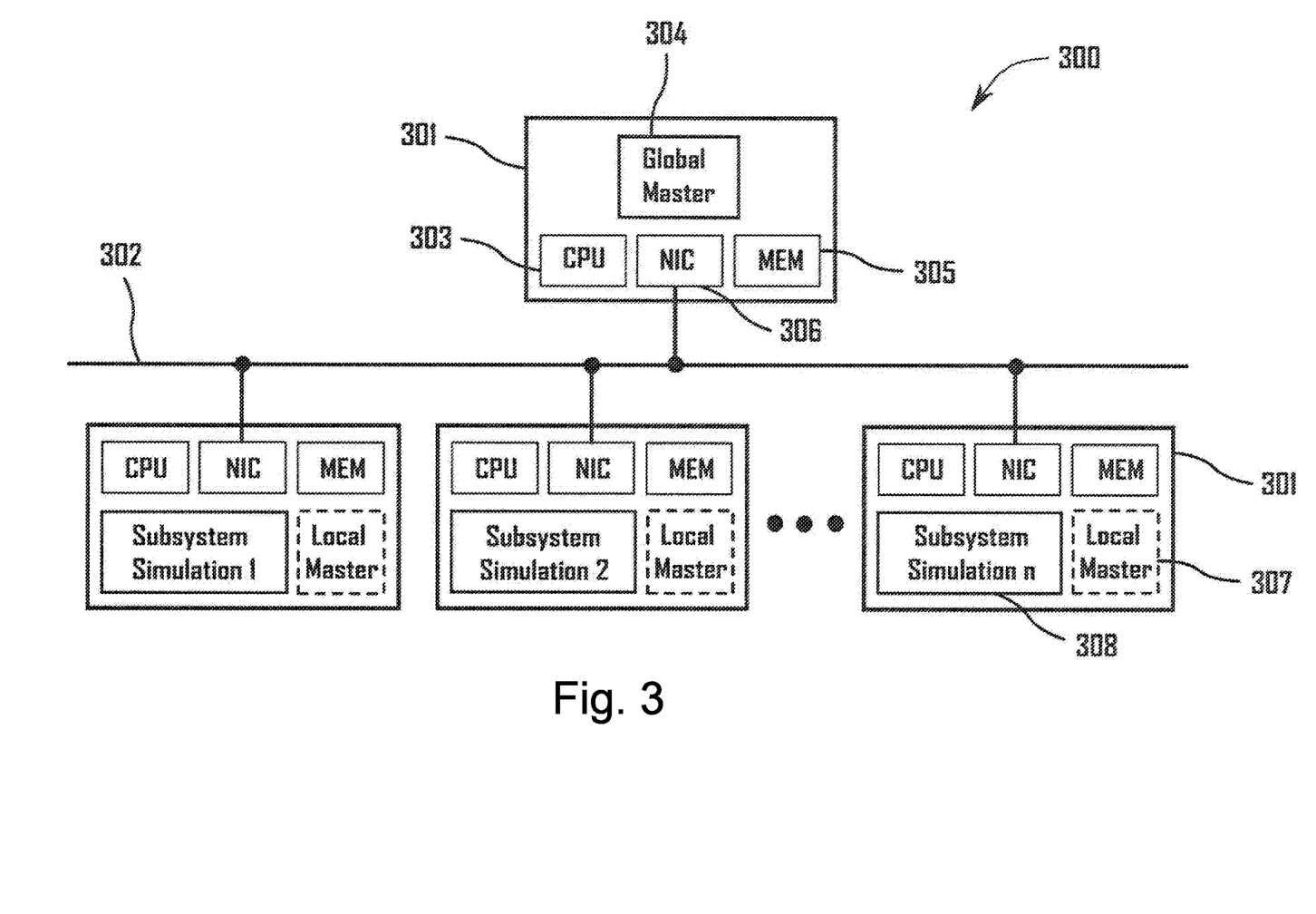
FIG. 3 shows a schematic block diagram pointing out the herein described architecture of the co-simulation device as well as central and distributed implementation possibilities of the pre-step co-simulation method.

FIG. 3 shows a schematic block diagram pointing out the herein described architecture of the co-simulation device as well as central and distributed implementation possibilities of the pre-step co-simulation method.

The pre-step co-simulation method is implemented within a central or distributed co-simulation computing architecture 300, consisting of computing nodes 301 and a communication network 302. Each computing node 301 consist of a memory 305 for storing data, a network interface device 306 for data communication and a processor 303 for processing instructions of programs, where a single node can also host and execute several programs.

The pre-step co-simulation method is implemented within a co-simulation program 304, 307, which coordinates all subsystem simulation processes 308 by starting, pausing, continuing, stopping and communicating data at communication point instances for synchronization purposes locally or to other relevant computing nodes 301. In particular, the co-simulation program 304, 307 is able to read from memory and write data to memory 305, such as relevant input and output variables and their time derivatives and optionally the corresponding partial derivatives of all subsystems. When executed by a processor 303 the processor conduct to compute (see step 104 in FIG. 1) the replacement system (Eq. 10-11) matrices and to assemble (see step 105 in FIG. 1) derived matrices (Eq. 15-16) in (step 101 in FIG. 1), to evaluate the Error Differential Equation (see step 106 in FIG. 1) for adjusting the co-simulation time increment (see step 107 in FIG. 1) and for approximation of the exact solution of output variables of the subsystems (see step 108 in FIG. 1) and to determine input variables by optimization (see step 109 in FIG. 1). Furthermore, when executed by a processor 303 the processor conduct to communicate the resulting inputs to corresponding subsystem simulation computing nodes prior to the current co-simulation time increment and to coordinate, i.e. start, continue, pause, stop, the individual subsystem simulation processes remotely.

During non-iterative co-simulation the coupled subsystems 308 are independently solved by the use of tailored fixed or variable step-size solvers. In the context of co-simulation δT denotes the numerical steps performed by the underlying solver within the individual subsystems 308. Further, for synchronization purposes an additional step-size is introduced. Also this so-called co-simulation time increment ΔT may be time varying and determines the points in time $t_{k+1}^i = t_k^i + \Delta T_k^i$ at which coupling data is exchanged between subsystem simulations, where k denotes the k-th co-simulation time increment and i denotes the i-th subsystem. In the most general case, instead of updating only the value at the coupling time instant, all available values in the time interval of the last co-simulation time increment are exchanged. This functionality is supported by high performance co-simulation platforms and leads to improved synchronisation capabilities.

Because of bidirectional dependencies between subsystems 308 and the modular (distributed) character of a co-simulation, several input signals (input values of first and second parameter) are unknown for the time interval of the current co-simulation time increment and thus, piecewise extrapolation of some coupling signals is necessary to solve the overall coupled system. Extrapolation is directly associated with an estimation error and thus, an inherent co-simulation discretization error is introduced. The invention described herein copes with this problem by disclosing a pre-step co-simulation method and the corresponding device.

FIG. 1 shows a flowchart 100 which depicts steps of the herein described pre-step co-simulation method for a single co-simulation time increment. In the following the individual steps of the flowchart 100 are detailed.

It is common practice to describe the behavior of physical real world objects via ordinary differential equations (ODEs). In general, in some cases additional algebraic constraints are stated, which directly leads to a subsystem 308 description via differential algebraic equations (DAEs) as shown in Equations (1-3); the explicit dependency on time is omitted:

$$\dot{x}^i = f^i(x^i, u^i), \quad (1)$$

$$y^i = g^i(x^i, u^i), \quad (2)$$

$$0 = h^i(x^i, u^i), i = 1 \ldots r. \quad (3)$$

Where $x^i$ represents the state variables and parameters of the i-th subsystem 308; $u^i$ and $y^i$ represent the corresponding input 201 and output 202 (see FIG. 2) variables of the subsystem, respectively; and r denotes the number of subsystems. These subsystems are modelled within special simulation tools and are typically solved by tailored numerical solvers 308. For disclosing the invention a linear version of the DAE system is outlined below:

$$\dot{x}^i = f^i(x^i, u^i) \approx A^i \cdot x^i + B^i \cdot u^i, \quad (4)$$

$$y^i = g^i(x^i, u^i) \approx C^i \cdot x^i + D^i \cdot u^i, \quad (5)$$

$$0 = h^i(x^i, u^i) \approx E^i \cdot x^i + F^i \cdot u^i. \quad (6)$$

Depending on the overall system simulation at hand dedicated inputs and outputs of the individual subsystems are interconnected. The interconnections are described via a coupling matrix, where the coupling matrix is identified based on the adjacency matrix of the directed graph (nodes represent subsystems and edges represent interconnections), which is generated from the overall co-simulation system. For a system comprising two fully coupled subsystems, i.e. $u^1 = y^2$ and $u^2 = y^1$, the subsystems interconnections are described by the coupling matrix L:

$$\begin{pmatrix} y^1 \\ y^2 \end{pmatrix} = \underbrace{\begin{pmatrix} 0 & 1 \\ 1 & 0 \end{pmatrix}}_{L} \cdot \begin{pmatrix} u^1 \\ u^2 \end{pmatrix}. \quad (7)$$

In contrast to known approaches, the herein disclosed invention is based on replacement subsystems, whose can be derived from the classical DAE descriptions (Eq. 1-3) by time derivation of the output variables of all subsystems till the input variables appears on the right hand side and derivation of the algebraic constraint equations as shown in Equations (8) and (9):

$$\dot{y}^i = S^i(y^i, u^i, \dot{u}^i), \quad (8)$$

$$0 = H^i(y^i, u^i, \dot{u}^i). \quad (9)$$

For sake of simplicity the approach w.r.t. the disclosed invention is described herein based on a single time derivation of the subsystems outputs; for relative degree smaller than one; generalization to multiple time derivations and higher relative degrees is straight forward. This way the original system (Eq. 1-3) is transformed into a new state space form (Eq. 8-9). Below, two options are described to determine the parameters of the replacement subsystems, both are based on approximated linear system descriptions:

$$\dot{y}^i = S^i(y^i, u^i, \dot{u}^i) \approx \frac{\partial S^i}{\partial y} \cdot y^i + \frac{\partial S^i}{\partial u} \cdot u^i + \frac{\partial S^i}{\partial \dot{u}} \cdot \dot{u}^i, \quad (10)$$

$$0 = H^i(y^i, u^i, \dot{u}^i) \approx \frac{\partial H^i}{\partial y} \cdot y^i + \frac{\partial H^i}{\partial u} \cdot u^i + \frac{\partial H^i}{\partial \dot{u}} \cdot \dot{u}^i. \quad (11)$$

Option 1: By utilization of an system identification algorithm (see below), where the inputs to the algorithm represent the input $u^i$ and output $y^i$ variables of the subsystems and their time derivatives $\dot{u}^i$ and $\dot{y}^i$, respectively. In this case no explicit transformation of the matrices of the original subsystems has to be performed.

Option 2: By realizing the system transformation (Eq. 12-14). Therefore, the partial derivatives of the state derivatives w.r.t. the state and input variables and the partial derivatives of the outputs w.r.t. the state and input variables and of all original subsystems (Eq. 1-6) has to be available. These matrices can be delivered by the subsystems itself via an enhanced co-simulation interface (e.g. the Functional Mockup Interface by Blochwitz) or identified online by appropriate system identification approaches. The replacement subsystem dynamic and input matrices are determined as follows:

$$\frac{\partial S^i}{\partial y} = C^i \cdot A^i \cdot C^{i-1}, \quad (12)$$

$$\frac{\partial S^i}{\partial u} = C^i \cdot B^i - C^i \cdot A^i \cdot C^{i-1} \cdot D^i, \quad (13)$$

$$\frac{\partial S^i}{\partial \dot{u}} = D^i, \quad (14)$$

with $A^i = \frac{\partial f^i}{\partial x}$;

$B^i = \frac{\partial f^i}{\partial u}$;

$C^i = \frac{\partial g^i}{\partial x}$ and $D^i = \frac{\partial g^i}{\partial u}$.

Notably, matrices $C^i$ has to be regular to ensure an inversion. However, in other cases an inversion by computation of the well-known pseudo-inverse serves as workaround.

Above, two times system identification were mentioned. For offline (non-real-time) and online (real-time) identification different approaches exist and can be applied by one skilled in the art. However, herein the well-known subspace method is mentioned for completeness. Based on the input and output variables of a subsystem the subspace method is able to identify the state-space representation, as stated in Equ. (10-11). This way, there is no need to specify the order of the replacement subsystems as the method automatically choose the best model order based on the singular-value decomposition, which depends on the input and output variables.

In order to ensure a stable co-simulation of especially stiff systems the cross-coupling effects of the interconnected subsystems have to be taken into account; therefore the individual replacement system (Eq. 10-11) and derived matrices (Eq. 15-16) of the individual subsystems 308 are assembled to global system matrices (see step 101 in FIG. 1) at coupling time instances.

Depending on the system at hand a reduced number of updates is possible, e.g. every third co-simulation increment or with each significant change of the system dynamics. For sake of simplicity, the following details are explained for a co-simulation consisting of two (r=2) subsystems 308; the generalization for a more complex system consisting of more subsystems is straight forward.

The following (global) matrices will be used by the Error Differential Equation (see step 106 in FIG. 1) and the result thereof is utilized to adjust the co-simulation time increment (see step 107 in FIG. 1) and to approximate the exact output variables 108 of the subsystems:

$$\tilde{A} = \begin{pmatrix} \frac{\partial S^1}{\partial y} & \frac{\partial S^1}{\partial u} \\ \frac{\partial S^2}{\partial u} & \frac{\partial S^2}{\partial y} \end{pmatrix}, \quad (15)$$

$$\tilde{B} = \begin{pmatrix} 0 & \frac{\partial S^1}{\partial \dot{u}} \\ \frac{\partial S^2}{\partial \dot{u}} & 0 \end{pmatrix},$$

$$\tilde{C} = \begin{pmatrix} \frac{\partial S^1}{\partial u} & 0 \\ 0 & \frac{\partial S^2}{\partial u} \end{pmatrix},$$

$$\tilde{D} = \begin{pmatrix} \frac{\partial S^1}{\partial \dot{u}} & 0 \\ 0 & \frac{\partial S^2}{\partial \dot{u}} \end{pmatrix}.$$

To generalize (global) matrices the couple matrix L essentially has to be taken into account, which is omitted here and can be derived by one skilled in the art.

On the other hand, for prediction of the future progress (see step 108 in FIG. 1) of the output variables (global) model-based extrapolation is performed based on the following (global) matrices:

$$\hat{A} = \begin{pmatrix} \frac{\partial S^1}{\partial y} & 0 \\ 0 & \frac{\partial S^2}{\partial y} \end{pmatrix}, \quad (16)$$

$$\hat{B} = \begin{pmatrix} \frac{\partial S^1}{\partial u} & 0 \\ 0 & \frac{\partial S^2}{\partial u} \end{pmatrix},$$

$$\hat{C} = \begin{pmatrix} \frac{\partial S^1}{\partial \dot{u}} & 0 \\ 0 & \frac{\partial S^2}{\partial \dot{u}} \end{pmatrix}.$$

The generalization works without knowledge of the coupling matrix, due to the fact that the matrices remain blockdiagonal matrices in any case.

In FIG. 1 the flowchart 100 depicts the main steps of the invented co-simulation algorithm. FIG. 2 shows a diagram 200 which indicates exemplarily the steps for one single co-simulation time increment. The computed co-simulation result 202 until the coupling time instant $t_k$ are communicated to the master algorithm. At this point in time ($t_k$) the determined and applied input $u^i$ 201 at $t_{k-1}$ over the interval $[t_{k-1}, t_k)$, the co-simulation result 202, i.e. the output $y^i$ at $t_k$ over the interval $(t_{k-1}, t_k]$, as well as the individual partial derivatives for assembling the (global) matrices (Eq. 15-16) are available.

In a first step the deviation between the applied past input $u^i$ 201 and the resulting output $y^i$ 202 are used to determine the co-simulation discretization error $\in^i$ over the past co-simulation time increment:

$$\in^i = y^i - u^i. \quad (17)$$

On this basis the exact output $\tilde{y}^i$ 203 over the past step is approximated by evaluation of the (global) Error Differential Equation 106:

$$\dot{\delta} = (I - \tilde{B})^{-1} \cdot (\tilde{A} \cdot \delta + \tilde{C} \cdot \epsilon + \tilde{D} \cdot \dot{\epsilon}), \quad (18)$$

with $\delta = (\delta^1, \delta^2)^T$ and $\in = (\in^1, \in^2)^T$, leading to an additional error measure $\delta^i$:

$$\delta^i = \tilde{y}^i - y^i, \quad (19)$$

where $\tilde{A}$, $\tilde{B}$, $\tilde{C}$ and $\tilde{D}$ are assembled matrices (Eq. 15) for the overall system. The approximation of the exact output $\tilde{y}^i$ 203 in step 106 is then determined by:

$$\tilde{y}^i = y^i + \delta^i. \quad (20)$$

Since Equation (18) represents an ordinary differential equation there is a variety of ways to solve it; focus is especially taken in linearly-implicit methods. Due to the fact that $y^i$ typically represents a physical signal it has to be continuous and therefore it follows that $\delta^L$ is continuous as well. Combining this property with the global initial value $\delta(t_{start})=0$ with Equation (18) leads to an initial value problem. Utilization of the linearly-implicit Euler scheme, i.e. a numerical solver, leads to:

$$\delta_k = \delta_{k-1} + \Delta T \cdot \left( I - \frac{\Delta T}{2} (I - \tilde{B})^{-1} \cdot \tilde{A} \right)^{-1} \cdot (I - \tilde{B})^{-1} \cdot \quad (21)$$
$$[\tilde{A} \cdot \delta_{k-1} + 0.5 \cdot \tilde{C} \cdot (\epsilon_k + \epsilon_{k-1}) + 0.5 \cdot \tilde{D} \cdot (\dot{\epsilon}_k + \dot{\epsilon}_{k-1})]$$

Note: The Error Differential Equation approach can be utilized to determine the approximation of the exact output of the subsystems in a standalone manner without co-simulation discretization error.

Due to errors $\delta^i$ and $\in^i$ a locally determination of an appropriate co-simulation time increment $\Delta T_k^i$ is possible 107. Due to fact that $\delta^i$ and $\in^i$ are independent from the other subsystems it is feasible to choose different constant co-simulation time increments for every subsystem. The co-simulation time increment can be updated at each communication point $t_k^i$ for every subsystem, which leads to a local and adaptive co-simulation time increment control 107. Three possible options are outlined below:

Option 1: Like in most well-known step size controls an error indicator:

$$err_{indicator1}^i = \frac{\int_{t_{k-1}^i}^{t_k^i} |\delta(t)| dt}{\int_{t_{k-2}^i}^{t_{k-1}^i} |\delta(t)| dt}, \quad (22)$$

is utilized with the aim of decreasing the co-simulation time increment if $\text{err}_{indicator1}{}^i$ is greater than a given threshold and increasing the co-simulation time increment if $\text{err}_{indicator1}{}^i$ is less than a given threshold.

Option 2: If numerical steps, based on $\delta T$, are available the strategy is to evaluate $$\tilde{y}\left(t_{k-1}^i + \frac{\Delta T_k^i}{2}\right) = \tilde{y}_{k-1,1/2}^i$$

and then compute:

$$\text{err}_{indicator2}^i = \frac{\int_{t_{k-1}^i}^{t_{k-1}^i + \frac{\Delta T_k^i}{2}} \left|\tilde{y}_{k-1}^i + \frac{2 \cdot (\tilde{y}_{k-1,1/2}^i - \tilde{y}_{k-1}^i)}{\Delta T_k^i} \cdot t - \tilde{y}^i(t)\right| dt + \int_{t_{k-1}^i + \frac{\Delta T_k^i}{2}}^{t_k^i} \left|\tilde{y}_{k-1,1/2}^i + \frac{2 \cdot (\tilde{y}_k^i - \tilde{y}_{k-1,1/2}^i)}{\Delta T_k^i} \cdot t - \tilde{y}^i(t)\right| dt}{\int_{t_{k-1}^i}^{t_k^i} |\delta(t)| dt}, \quad (23)$$

as the required error indicator. The strategy to adapt the co-simulation time increment is the same as in Option 1 above, exclusively the error indicator changes to $\text{err}_{indicator2}{}^i$.

Option 3: a model-based step-size control utilizes the slope of the extrapolated output variables and computes the error indicator $$\text{err}_{indicator3}^i = \frac{|s_{k-1}^i - s_k^i|}{|s_{k-1}^i| + |s_k^i|}, \quad (24)$$

where $s_k^i$ denotes the slope of the extrapolation of the local output variable in $t_k^i$ for the i-th subsystem. The strategy to determine the co-simulation time increment is the same as in Option 1 above, exclusively the error indicator changes to $\text{err}_{indicator3}{}^i$.

Note: All three options above are based on local variables and therefore the co-simulation time increment can be determined locally, independently for every subsystem. For practical issues an additive combination of all options may be implemented.

To ensure the implict nature of this pre-step co-simulation algorithm the prediction of the future progress of the approximated exact output $\tilde{y}^i$ (graph 203 in FIG. 2) over the next co-simulation time increment (see step 108 in FIG. 1), denoted as $\hat{y}^i$ (graph 204 in FIG. 2), is essential. Depending on the available information two options for prediction of the future progress are possible:

Option 1: A (global) model-based extrapolation is performed, which is based on the (global) assembled dynamic matrix $\hat{A}$ and input matrices $\hat{B}$ and $\hat{C}$ (Eq. 16)

$$\dot{\hat{y}} = (I - \hat{C} \cdot L)^{-1} \cdot (\hat{A} + \hat{B} \cdot L) \cdot \hat{y} \quad (25)$$

with $\hat{y} = (\hat{y}^1, \hat{y}^2)^T$. The initial condition $\hat{y}_k^i$ for the solution of the initial value problem (Eq. 25) originates from the solution of the Error Differential Equation, it holds:

$$\hat{y}_k^i = \tilde{y}_k^i. \quad (26)$$

Option 2: A (evtl. local) signal-based extrapolation (graph 204 in FIG. 2) is performed based on the approximation of the exact output (graph 203 in FIG. 2) and the data available until the coupling time instant. Local means, that every subsystem can perform it's own extrapolation independently. There is wide variety of well-known extrapolation techniques like polynomial extrapolation using time derivatives of the signal. There are a lot of well-known methods for computing derivatives; herein the proposal is to use the recently proposed DELC-Method, see Genser-2017.

Notably, Option 1 is preferred as the cross-coupling effects of the subsystems are considered, which are essential for handling of stiff system integration.

After prediction of the future progress 204 based on the approximated output 203, the input 201 of the next co-simulation time increment has to be determined by global or local optimization 109. Local means, that this part of the pre-step co-simulation method can be computed locally 307 at the different computing nodes 301 and there is no need for globally assembled matrices in this part of the algorithm. The optimization is done by minimizing the following objective function over the next co-simulation time increment:

$$\min_{u_i, t \in [t_k, t_{k+1}]} |\hat{y}^i(t) - y^i(t)|. \quad (27)$$

As this optimization 109 and the resulting input variable 201 is also computed at the coupling time instant prior to the next co-simulation increment, this approach is called pre-step co-simulation method. Note, in the particular case of handling DAE subsystems the algebraic subsystem equations like (Equ. 11) have to be considered as an additional constraint within the input optimization. The five following options are possible.

Option 1: The input 201 for the next co-simulation time increment can be determined by energy preservation means, where the integral of the prediction of the future progress 204 and the integral of the input 201 over the next co-simulation time increment equals:

$$\int_{t_k^i}^{t_{k+1}^i} \hat{y}^i(t) dt = \int_{t_k^i}^{t_{k+1}^i} y^i(t) dt. \quad (28)$$

Option 2: The input 201 to the next co-simulation time increment can be determined by explicitly solving the minimization problem (Equ. 27). The input is determined by discretization of the minimization problem (Equ. 27), e.g. by the co-simulation time increment $\Delta T$, leading to the explicit algebraic equation:

$$u_k^i = \phi_{\frac{\partial S^i}{\partial u}}^{-1} \cdot \left(\hat{y}_{k+1}^i - \phi_{\frac{\partial S^i}{\partial y}} \cdot y_k^i\right). \quad (29)$$

where $$\phi_{\frac{\partial S^i}{\partial y}} \text{ and } \phi_{\frac{\partial S^i}{\partial u}}$$

denotes the well-known transitions matrices corresponding to the dynamic matrix $$\frac{\partial S^i}{\partial y}$$

and the input matrix $$\frac{\partial S^i}{\partial u}$$

of the local replacement subsystems. This equation is based on a constant (zero-order-hold) input variable 201, i.e. a constant input value over the next co-simulation time increment as illustrated in FIG. 2, but this can be generalized for other forms/kinds of the input 201 extrapolation, e.g. first-order-hold or an arbritary sequence of values, in general (herein omitted for sake of simplicity).

Option 3: The input 201 for the next co-simulation time increment can be determined by solving the minimization problem (Equ. 27) as a Variational Approach in general.

Option 4: In another aspect, the input 201 can be determined in an iterative manner, without solving the subsystems 308, by introducing an additional part 113 into the flowchart 100. After the determination of the input 109 and before the local simulation of the subsystems 103, the Error Differential Equation is iteratively solved for several times by using a redefined discretisation error:

$$\in^i = \tilde{y}^i - u^i, \qquad (30)$$

for the next co-simulation time increment. On this basis new input variables 201 are iteratively determined at the coupling time instant prior (!) to the co-simulation increment.

Option 5: The input (graph 201 in FIG. 2) for the next co-simulation time increment can be determined (truly) iteratively by utilizing the computed output variables 202 of the co-simulated subsystem over the next co-simulation time increment. By this approach the individual subsystems are (truly) iteratively solved for several times. In contrast to the other non-iterative co-simulation options mentioned above, this would lead to an iterative co-simulation approach. Iterations are performed until a predefined accuracy threshold is reached.

The sections above describe the pre-step co-simulation algorithm. Depending on the available computing architecture two possibilities for implementation exist: a centralized-master 304 approach and a distributed-master 304, 307 approach, as shown in FIG. 3.

Option 1: The centralized-master 304 approach is characterized by the implementation of the whole pre-step co-simulation algorithm 100 in a single computer-executable program running on a dedicated computing node 301. This approach can be considered as a single master approach, where all the necessary data, i.e. input and output variables of the subsystems and their time derivatives, respectively, and optionally the partial derivatives of the individual (replacement) subsystems, if provided by the subsystems itself, is communicated via the communication network 302 to the single master algorithm program 304. In this case, the centralized-master 304, optionally identify the replacement subsystems matrices (Eq. 10-11) of the individual subsystems 308 based input 201 and output 202 variables of the subsystems and their time derivatives, respectively, assembles the required matrices (Eq. 15-16, 101), evaluates the Error Differential Equation 106, determines the next co-simulation time increment 107, performs the prediction of the future progress of the approximated exact solution 108 as well as optimizes the input variables for the next co-simulation time increment 109 at the current coupling time instant.

For realization of the pre-step co-simulation a dedicated order of execution of the centralized-master program 304, the computation of the co-simulation time increments of the individual subsystems 111 and the communication of data 112 has to be considered. This is ensured by the centralized-master program 304, which controls the individual subsystems 308, as described in the following. In a first instance, at each coupling time instant Tk, the master algorithm gathers the initial input 201 and output 202 variables of the parameters of the subsystems 308 and their time derivatives, respectively, as well as optionally partial derivatives from the individual (replacement) subsystems (Eq. 10-11) if determined at the individual computing nodes of the subsystems, optionally computes 104 required partial derivatives for the replacement subsystems (Eq. 10-11) of the individual subsystems 308 based on input 201 and output 202 variables and their time derivatives and assembles 105 the required matrices (Eq. 15-16, 101), evaluates the Error Differential Equation 106, determines the next co-simulation time increment 107, performs the prediction of the future progress of the approximated exact solution 108 as well as optimizes the input variables 109 for the next co-simulation time increment. In a second step, the determined inputs 201 and partial derivatives are stored to memory 305 sent to the corresponding subsystems via the communication network 110, which directly trigger the execution of the subsystem co-simulation step 111. At the end of the current subsystem time increment the subsystem simulation is paused and the resulting output variables 202 are sent back to the centralized-master node 301 via the communication network and are stored 110 by the centralized-master algorithm 304, which directly triggers the execution of the next co-simulation step. This procedure repeats for computation of subsequent co-simulation time increments until the end of the overall co-simulation is reached, where the subsystem simulations are forced to stop by the centralized-master 304.

Option 2: The distributed-master 304, 307 approach is characterized by the separation of the pre-step co-simulation algorithm into several parts which are running on different computing nodes in order to improve the overall simulation performance in terms of speed. The first part is represented by a computer-executable program 304 running on a dedicated computing node, where all the necessary data, input 201 and output 202 variables of the subsystems 308 and their time derivatives, respectively, as well as optionally partial derivatives from the individual (replacement) subsystems (Eq. 10-11) if determined at the individual computing nodes of the subsystems, is communicated via the network 302 to this part of the master algorithm 304. This part of the algorithm optionally computes 104 required partial derivatives (Eq. 10-11) of the individual subsystems 308 based on input 201, input derivatives and output 202 variables and assembles 105 the required matrices (Eq. 15-16, 101), evaluates the Error Differential Equation 106, optionally determines the local next co-simulation time increments 107 and optionally performs a global prediction (model-based) of the future progress of the approximated exact solution 108 for the next co-simulation time increment at the current coupling time instant. Other parts are represented by a computer-executable program 307 running on computing nodes 301 where the subsystems 308 are executed too, where each of these parts locally and optionally computes 104 required partial derivatives (Eq. 10-11) of the individual subsystems 308 based on input 201, input derivatives and output 202 variables of the subsystems and their time derivatives, respectively, optionally determines the local next co-simulation time increments 107, optionally performs a global prediction (model-based or signal-based) of the future progress of the approximated exact solution 108 for the next co-simulation time increment and perform the optimization 109 of the input 201 variables for the next co-simulation time increment at the current coupling time instant.

For realization of the pre-step co-simulation 100 a dedicated order of execution of the distributed-master program 304, 307, the computation of the co-simulation time increments 111 of the individual subsystems 308 and the communication of data via the communication network 302 has to be considered 103. This is ensured by the distributed-master program 304, 307) which controls the individual subsystems 308, as described in the following.

In a first instance, at each coupling time instant Tk, the master algorithm 304 gathers the initial input 201 and output 202 variables of the subsystems 308 and their time derivatives, respectively, as well as optionally partial derivatives from the individual (replacement) subsystems (Eq. 10-11) if determined at the individual computing nodes of the subsystems, optionally computes 104 required partial derivatives for the replacement subsystems (Eq. 10-11) of the individual subsystems 308 based on input 201 and out variables and their time derivatives and assembles 105 the required matrices (Eq. 15-16, 101), evaluates the Error Differential Equation 106, optionally determines the local next co-simulation time increments 107 and, optionally, performs the prediction (model-based) of the future progress of the approximated exact solution 108. In contrast to the centralized-master approach, in a second step, the determined exact solution 204 or the prediction (model-based) future progress of the approximated exact solution 108 is optionally sent to the corresponding local masters 307 at subsystems computation nodes 301, where optionally the future progress of the approximated exact solution is locally predicted (model-based or signal-based), optionally the next co-simulation time increment 107 is determined and the input variables 201 for the next co-simulation time increment are optimized 109. After local optimization 109 the resulting input variables 201 are stored and communicated 110 to the other part of the master 304 via the communication network 302 and execution of the subsystem co-simulation step is triggered 111. At the end of the current subsystem time increment the subsystem simulation is paused, optionally the required subsystem partial derivatives are locally computed and stored into memory 305 and the resulting output variables 202 are sent back to the distributed master program 304, which directly triggers the execution of the next co-simulation step. This procedure repeats for computation of subsequent co-simulation time increments until the end of the overall co-simulation is reached, where the subsystem simulations are forced to stop by the distributed master.

The following sections describe the related co-simulation device 300 for execution of the pre-step co-simulation method. FIG. 3 shows the architecture of the co-simulation device, which consists of different computing nodes 301 and a communication network 302 in general.

A computing node 301 consists of at least one central processing unit, the CPU 303, a memory 305 and a network interface card, the NIC 306. The computing node can be instructed to carry out arbitrary sequences of arithmetic or logical operations automatically, which are defined within computer-executable programs. The memory 305 of the computing node is used, on the one hand, for storing information for immediate use in order to perform the arithmetic or logical operations (stored in a random-access memory, RAM storage) and used, on the other hand, for storing the programs and related data (stored in a hard-disc-drive, HDD storage). The network interface card 306 is a hardware component of a computing node that connects a computing node to a network of computing nodes 302, which consists of a network interface controller for data communication via local area (LAN) or a wide area networks (WAN) by utilizing a dedicated communication protocol, such as TCP/IP, UDP, CAN or for wireless communication Bluetooth or LTE, based on GSM/EDGE and UMTS/HSPA technologies, is used. For real-time applications typically EtherCAT or TT-Ethernet is implemented.

For implementation of the pre-step co-simulation method the outlined algorithm 100, 200 is realized within computer-executable programs 304, 307 for the centralized- or distributed master approach. Subsystem simulation models are solved by tailored solvers within dedicated simulation tools (subsystems) 308. In case of a dedicated co-simulation scenario the different computer-executable algorithms 304, 307, 308 are distributed over an existing network of computing nodes 301, whereas also multiple computer-executable programs can run on a single computing node.

In an exemplary application of the pre-step co-simulation method, the master program 304 is executed by the central processing unit 303 of the corresponding computing node 301 and, in a first step after initiation of the master program 304, the processor 303 conducts to compute the (replacement) subsystem matrices for all subsystems 101. The optionally stored partial derivatives from the original subsystems are read from the local HDD memory or are optionally determined by utilization of a system identification scheme based on the available input 201 and output 202 variables of the subsystems and their time derivatives, respectively, e.g. by application of the subspace identification method, to compute 104 the required partial derivatives (Eq. 10-11) of the individual (replacement) subsystems 308 and assembles 105 the required matrices (Eq. 15-16, 101). The processor conducts afterwards to write the resulting matrices into the local RAM memory of the computing node. These matrices are utilized by the subsequent instructions of the master program for evaluation of the Error Differenation Equation for approximating the exact output variables 106, subsequently for determining the length of the next co-simulation time increment 107, for the prediction of the future progress of the exact output variable 108 of the next co-simulation time increment, and for the optimization of the input variables 109 for the next co-simulation time increment. For these calculations the instructions of the master programme 304 causes the processor 303 to perform the related arithmetic and logical operations as well as the intermediate reading and writing of variables to the local RAM or HDD memory 305.

In case of a distributed co-simulation scenario, implemented in a distributed computing network 300, where the different computer-executable programs (master 304, 307 and several subsystem simulation programs 308) are allocated to different computing nodes 301 within the network of computing nodes, the processor 303 of the master computing node 301 reads the corresponding values from the memory and forces the network interface controller of the network interface card 306 to transmit the input variables 201 and optionally their time derivatives to the individual subsystem simulation computation nodes 301, respectively, by utilizing the implemented communication network 302 and the corresponding communication protocol. As soon as the transmitted data is received at the subsystem computing nodes 301 the corresponding network interface controllers on the network interface cards 306 are indicating the arrival of new input variables to the subsystem 308 simulation, which stores these values to the local memory 305 and triggers the execution of the co-simulation time increment 111. The resulting output variables 202 of the individual subsystem simulation 308 at the end of the co-simulation time increment are stored into the local memory 305. The subsystem simulation program 308 executed by the local processor 303 conducts the transmission of the output variables by the local network interface controller via the network interface card 306 to the master computing node 301. As soon as the transmitted data is received by the master computing nodes the corresponding network interface controller on the network interface cards 306 are indicating the arrival of new output variables 201 to the master program 304, which writes these values to the local memory 305 and triggers the execution of the next co-simulation time increment.

Another important case is represented by real-time applications. The herein disclosed pre-step co-simulation method is primarily developed for non-iterative co-simulation and thus, the method possesses determined runtime behavior and fulfills the main requirement for real-time application. On the one hand, the method can be applied for realization of a time-triggered co-simulation on a single computing node and, on the other hand, the method can be implemented in a distributed real-time co-simulation scenario, where a plurality of real-time computation nodes 301 is connected via an appropriate (real-time capable) communication network 302, e.g. EtherCAT, TT-Ethernet, UDP, CAN or LTE 5G. In this case, asynchronous communication between the individual subsystems is realized, i.e. the individual subsystems are time-triggered by the counter (clock) of the corresponding computation node. As the real-time behavior of the different computer-executable programs is ensured by the utilized computing hardware and the scheduler of the program hosting operating systems, the required input and output variables, and optionally the partial derivatives of the individual subsystems, are available in time for correct execution of the pre-step co-simulation method.

Hence, a co-simulation computing device according to the present invention comprises a single or multiple computing nodes 301 connected via a communication network 302 to a network of computing nodes, a memory area 305 to store the input, input derivative, output and output derivative variables, the computed partial derivatives of the individual (replacement) subsystems (Eq. 10-11) and the assembled required matrices (Eq. 15-16) and processors having access to the memories 305 of the computing nodes 301 and configured to execute the inventive method.

The described details represent the basis for the flowchart 100 depicted in FIG. 1. The flowchart is roughly separated into three main blocks: the computation of the required matrices 101, the determination of the input variables for the next co-simulation time increment 102 and the execution of the next co-simulation time increment 103 by utilizing the co-simulation device. Super block 101 comprises the computation 104 of the required partial derivatives (Eq. 10-11) of the individual (replacement) subsystems 308 based on input 201 and output 202 variables of the subsystems and their time derivatives, respectively, and assembles 105 the required matrices (Eq. 15-16, 101).

Super block 102 comprises the evaluation of the global Error Differential Equation 106, using the computed global assembled matrices 101 for approximating the exact outputs variables for all subsystems, the, optional locally, determining of the adequate co-simulation time increment 107, the, optional locally, prediction of the future progress of the output variables 108. These predicted output variables 108 ensure the implicit character of the pre-step method and serve as fundamental basis for the, optionally local, optimization of the input variables 109 for the next co-simulation time increment.

Super block 103 comprises the storage and communication of the determined input variables by the co-simulation device 110, which triggers the individual subsystems for execution of the next co-simulation time increment 111. After computation of the co-simulation time increment the resulting output variables are communicated and stored by the co-simulation device 112, which triggers the computation of the subsequent co-simulation time increment by repeating the process, starting with 101.

Figure 4:
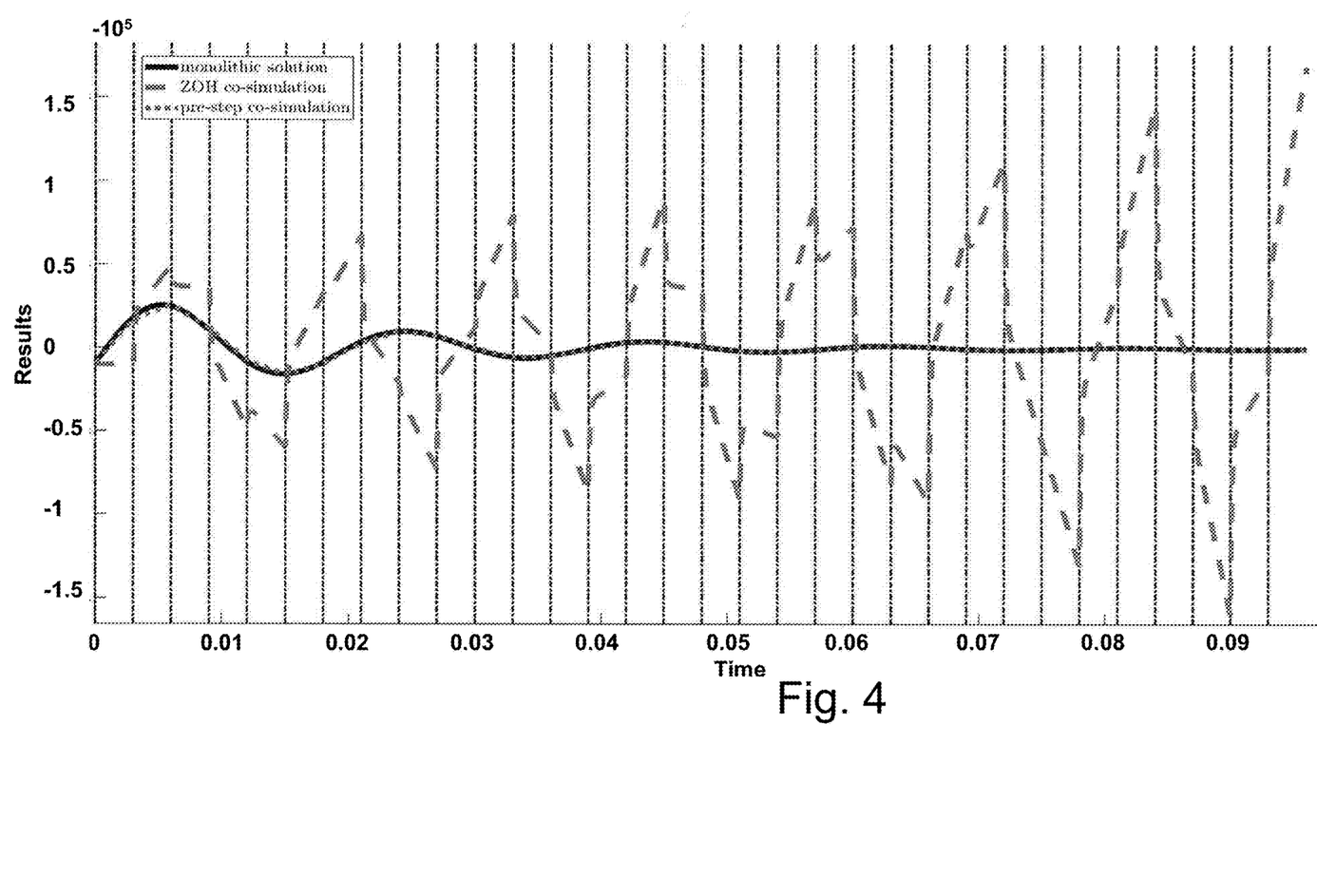
FIG. 4 shows a simulation result indicating the performance improvement by application of the herein described computer-implemented co-simulation method.

Finally, an example is examined and the results are shown in FIG. 4. Three different simulations were performed: a monolithic simulation serving as reference for comparison, a co-simulation by applying the simplest possible but most often used coupling approach (called zero order hold, ZOH) and a pre-step co-simulation indicating the benefit and performance improvement of the herein outlined invention in terms of accuracy and stability. An overall stiff system was chosen consisting of two subsystems 308. For sake of simplicity a single output variable is illustrated. The vertical lines represent the communication points in time (coupling time points Tk) used with respect to a constant co-simulation time increment. FIG. 4 points out that the ZOH approach diverges due to the ZOH introduces co-simulation discretization error and the result from the pre-step co-simulation method is almost superimposable with the monolithic solution, indicating that co-simulation discretization errors are almost mitigated by the disclosed method.

For demonstration purposes the pre-step co-simulation method is exemplarily applied to a distributed vehicle simulation and test environment, comprising a real vehicle mounted on a classical powertrain testbed and virtual wheels embedded within a virtual environment. High stiffness exists as the dynamics of the wheel slip significantly differs to those of the vehicle by several magnitudes. The mechanical link between the real vehicle and the virtual wheels is represented by the four half-shafts, where each one is connected to a torque-controlled e-drive, i.e. a so called Dynometer. The set torque to each e-drive controller is determined by the corresponding virtual wheel within the virtual environment (incl. modelled friction, road slope, etc.) based on the measured rotational speed (e.g. first parameter v) of the corresponding half-shaft of the real vehicle. Each half-shaft torque (e.g. second parameter F) and rotational speed (angular velocity) represent coupling signals, i.e. a power bond. The input signal into the wheel simulation is a rotational speed signal and the output signal is the resulting torque. As the overall simulation is performed in real-time, a parallel co-simulation is necessary and thus, at every coupling time instant the rotational speed signal and the torque signal has to be extrapolated. Due to extrapolation the herein addressed co-simulation discretization error is introduced and the energy-transfer over the half-shaft is distorted, which has a negative impact on the final simulation and test performance. In particular, a higher extrapolated wheel rotational speed will lead to a higher counter torque response over this co-simulation time increment. Hence, the feedback onto the source system (i.e. the vehicle on the powertrain testbed) is higher it can thus speed up more than it should have.

Because rotational speed is a signal over the interface, the wheel will also speed up too much, compare to FIG. 4. This significantly affects test results, e.g. vehicle energy consumption, on short (over the current co-simulation time increment Tk) and long term (over the whole test run). The classical/typical procedure for mitigation is the utilization of very small sampling times (i.e. co-simulation time increment) leading to a massive over-sampling (10 kHz) and increased costs in terms of high-performance software and hardware components (e.g. EtherCAT real-time bus system).

By application of the herein disclosed pre-step co-simulation method the co-simulation discretization error is compensated prior to the calculation of the co-simulation time increment, eliminating the problem described above. In this case the real vehicle mounted on the power-train testbed represents a computing node and the wheels simulated within the virtual environment are assigned to another computing node; the computing nodes are connected via a communication network as illustrated in FIG. 3. In particular, the speed signals as well as the torque signals at the individual half-shafts are modified according to FIG. 1 and FIG. 2 prior to the calculation of the wheel torque responses for the actual co-simulation time increment Tk, leading to a stabilizing effect as indicated in FIG. 4. This way the wheel accelerates as expected and the distortion is reduced to a minimum which enables the application of larger co-simulation time increments and, as a consequence, the usage of cheaper software and hardware components.

It should be noted that the term "comprising" does not exclude other elements or steps and the article "a" or "an" does not exclude a plurality. Also elements described in association with different embodiments may be combined. It should also be noted that reference signs in the claims should not be construed as limiting the scope of the claims.

The invention claimed is:

1. A method for simulating a real physical model on the basis of a pre-step co-simulation system, the method comprising:
   providing a first subsystem simulating at least one first parameter v of the real physical model on the basis of a first equation system, wherein the first equation system is configured for determining the first parameter v on a basis of at least one second parameter F,
   providing a second subsystem simulating the at least one second parameter F of the real physical model on the basis of a second equation system, wherein the second equation system is configured for determining the second parameter F on a basis of the at least one first parameter v, wherein the first input value v_in of the first parameter v in the second subsystem and the second input value F_in of the second parameter F in the first subsystem are estimated by extrapolation at a first coupling time point T, k−1,
   determining a first output value v_out of the first parameter v by the first subsystem and a second output value F_out of the second parameter F by the second subsystem,
   determining a first error between the estimated first input value v_in of the first parameter v and the determined first output value v out of the first parameter v and a second error between the estimated second input value F_in of the second parameter and the determined second output value of the second parameter F at a subsequent second coupling time point,
   defining a first local replacement model of the real physical model which is based on partial derivatives of the first subsystem, and
   defining a second local replacement model of the real physical model which is based on partial derivatives of the second subsystem, wherein on the basis of the first local replacement model and the second local replacement model an Error Differential Equation is defined,
   wherein the Error Differential Equation is configured for receiving the first error and the second error for determining a first characteristic of the first parameter v over time and/or a second characteristic of the second parameter F over time between the first coupling time point T, k−1 and a subsequent second coupling time point Tk,
   wherein on the basis of the first characteristic of the first parameter v and/or the second characteristic of the second parameter F the first input value v_in of the first parameter v and/or the second input value F_in of the second parameter F at the subsequent second coupling time point Tk is optimized for simulating the first parameter v in the first subsystem and/or the second parameter F in the second subsystem.

2. The method according to claim 1,
   defining a global replacement model of the real physical model which is based on partial derivatives of the first subsystem and on partial derivatives of the second subsystem,
   wherein the global replacement model is configured for estimating a future characteristic of the first parameter v and/or the second parameter F between the second coupling time point Tk and a third coupling time point T, k+1 such that a next first input value v_in of the first parameter v and a next second input value F_in of the second parameter F at the second coupling time point Tk can be determined.

3. The method according to claim 2,
   wherein the global replacement model is based on a transformation of the first subsystem and the second subsystem by time derivation of the first output value v_out of the first parameter v and the second output value F_out of the second parameter F.

4. The method according to claim 1,
   wherein the solution of the Error Differential Equation is approximated by an explicit or implicit numerical solver.

5. The method according to claim 1,
   wherein the estimation by extrapolation is a model-based extrapolation for prediction of the approximated exact output variables is utilized.

6. The method according to claim 1,
   wherein the estimation by extrapolation is a signal-based extrapolation for prediction of the approximated exact output variables is utilized.

7. The method according to claim 1,
   wherein the optimization of the input variables is based on a variational approach.

8. The method according to claim 1,
   wherein the partial derivatives of the first subsystem and the partial derivatives of the second subsystem are calculated instantaneously, in particular by using a subspace system identification algorithm.

9. The method according to claim 1, wherein a time increment between the first coupling time point T, k−1 and the second coupling time point Tk is adapted on the basis of the first error and the second error.

10. A simulating device for simulating a real physical model on the basis of a pre-step co-simulation system, the device comprising:
   a processor;
   a memory unit in communication with the processor, the memory unit having stored therein
   a first subsystem unit having a first subsystem simulating at least one first parameter v of the real physical model on the basis of a first equation system, wherein the first equation system when executed by the processor is configured for determining the first parameter v on a basis of at least one second parameter F, a second subsystem unit having a second subsystem simulating the at least one second parameter F of the real physical model on the basis of a second equation system, wherein the second equation system when executed by the processor is configured for determining the second parameter F on a basis of the at least one first parameter v, an estimating unit when executed by the processor configured for estimating the first input value v_in of the first parameter v in the second subsystem and the second input value F_in of the second parameter F in the first subsystem by extrapolation at a first coupling time point T, k−1, wherein a first output value v_out of the first parameter v is determinable by the first subsystem and a second output value F_out of the second parameter F is detemiable by the second subsystem, an error determination unit when executed by the processor configured for determining a first error between the estimated first input value v_in of the first parameter v and the determined first output value vout of the first parameter v and a second error between the estimated second input value F_in of the second parameter F and the determined second output value F_out of the second parameter F at a subsequent coupling time point Tk, an Error Differential Equation unit for defining a first local replacement model of the real physical model which is based on partial derivatives of the first subsystem and for defining a second local replacement model of the real physical model which is based on partial derivatives of the second subsystem, wherein on the basis of the first local replacement model and the second local replacement model an Error Differential Equation is definable by the Error Differential Equation unit, wherein the Error Differential Equation when executed by the processor is configured for receiving the first error and the second error for determining a first characteristic of the first parameter v over time and/or second characteristic of the second parameter F over time between the first coupling time point and a subsequent second coupling time point Tk, and an optimization unit when executed by the processor configured for optimizing the first input value v_in of the first parameter v and/or the second input value F_in of the second parameter F at the subsequent coupling time point at Tk on the basis of the first characteristic of the first parameter v and/or the second characteristic of the second parameter F for simulating the first parameter v in the first subsystem and/or the second parameter F in the second subsystem.

11. The simulating device according to claim 10, further comprising:

a single or multiple computing nodes connected via a communication network to a network of computing nodes;

a memory area to store the input values of the first and second parameter, the partial derivatives, output values of the first and second parameter and in particular output derivative variables, the computed partial derivatives of the subsystems and the first and second equations;

the processor having access to the memory area and respective memory units of the computing nodes and configured to execute a method including, providing a first subsystem simulating at least one first parameter v of the real physical model on the basis of a first equation system, wherein the first equation system when executed by the processor is configured for determining the first parameter v on a basis of at least one second parameter F, providing a second subsystem simulating the at least one second parameter F of the real physical model on the basis of a second equation system, wherein the second equation system when executed by the processor is configured for determining the second parameter F on a basis of the at least one first parameter v, wherein the first input value v_in of the first parameter v in the second subsystem and the second input value F_in of the second parameter F in the first subsystem are estimated by extrapolation at a first coupling time point T, k−1, determining a first output value v_out of the first parameter v by the first subsystem and a second output value F_out of the second parameter F by the second subsystem, determining a first error between the estimated first input value v_in of the first parameter v and the determined first output value v out of the first parameter v and a second error between the estimated second input value F_in of the second parameter and the determined second output value of the second parameter F at a subsequent second coupling time point, defining a first local replacement model of the real physical model which is based on partial derivatives of the first subsystem, and defining a second local replacement model of the real physical model which is based on partial derivatives of the second subsystem, wherein on the basis of the first local replacement model and the second local replacement model an Error Differential Equation when executed by the processor is defined, wherein the Error Differential Equation when executed by the processor is configured for receiving the first error and the second error for determining a first characteristic of the first parameter v over time and/or a second characteristic of the second parameter F over time between the first coupling time point T, k−1 and a subsequent second coupling time point Tk, wherein on the basis of the first characteristic of the first parameter v and/or the second characteristic of the second parameter F the first input value v_in of the first parameter v and/or the second input value F_in of the second parameter F at the subsequent second coupling time point Tk is optimized for simulating the first parameter v in the first subsystem and/or the second parameter F in the second subsystem.

12. The simulating device according to claim 11, wherein the computing nodes represent real-time systems and the communication of data is preformed asynchronously.

13. A non-transitory computer-readable medium on which there is stored a computer program for simulating a real physical model, the computer program, when being executed by a data processor, is adapted for performing and/or controlling a method including, providing a first subsystem simulating at least one first parameter v of the real physical model on the basis of a first equation system, wherein the first equation system is configured for determining the first parameter v on a basis of at least one second parameter F, providing a second subsystem simulating the at least one second parameter F of the real physical model on the basis of a second equation system, wherein the second equation system is configured for determining the second parameter F on a basis of the at least one first parameter v, wherein the first input value v_in of the first parameter v in the second subsystem and the second input value F_in of the second parameter F in the first subsystem are estimated by extrapolation at a first coupling time point T, k−1, determining a first output value v_out of the first parameter v by the first subsystem and a second output value F_out of the second parameter F by the second subsystem, determining a first error between the estimated first input value v_in of the first parameter v and the determined first output value v out of the first parameter v and a second error between the estimated second input value F_in of the second parameter and the determined second output value of the second parameter F at a subsequent second coupling time point, defining a first local replacement model of the real physical model which is based on partial derivatives of the first subsystem, and defining a second local replacement model of the real physical model which is based on partial derivatives of the second subsystem, wherein on the basis of the first local replacement model and the second local replacement model an Error Differential Equation is defined, wherein the Error Differential Equation is configured for receiving the first error and the second error for determining a first characteristic of the first parameter v over time and/or a second characteristic of the second parameter F over time between the first coupling time point T, k−1 and a subsequent second coupling time point Tk, wherein on the basis of the first characteristic of the first parameter v and/or the second characteristic of the second parameter F the first input value v_in of the first parameter v and/or the second input value F_in of the second parameter F at the subsequent second coupling time point Tk is optimized for simulating the first parameter v in the first subsystem and/or the second parameter F in the second subsystem.

* * * * *